March 26, 1935.  R. GÖTZ  1,995,978
CAGELESS ROLLER BEARING
Filed Sept. 26, 1932

R. Götz
INVENTOR

By Marks & Clerk
Attys

Patented Mar. 26, 1935

1,995,978

UNITED STATES PATENT OFFICE 1,995,978

CAGELESS ROLLER BEARING

Richard Götz, Berlin-Lichterfelde-Sud, Germany; Leonore Götz, heir of said Richard Götz, deceased Application September 26, 1932, Serial No. 634,960
In Germany December 16, 1931

3 Claims. (Cl. 308—206)

This invention relates to a new and improved cageless roller bearing, wherein separating rollers, of a diameter smaller than that of the bearing or load carrying rollers, are disposed between the load carrying rollers for preventing undesirable sliding friction between the latter rollers, so that they may operate with a free rolling action.

I have found it to be desirable, in a roller bearing of this type, that the separating rollers exert little or no pressure against the bearing races and that these separating rollers be capable of being freely carried around the axis of the journal by the corresponding movement of the load carrying rollers. In those roller bearings embodying separating rollers, as heretofore constructed, the separating rollers have not fulfilled these requirements, and have, accordingly, been subjected to excessive sliding friction and wear, resulting in part from the separating rollers being pressed against the outer race by centrifugal force, and in part from the tendency for the separating rollers to be wedged against the outer race by the load carrying rollers.

I have discovered, further, that the desired free running of the separating rollers is dependent upon, what may be conveniently referred to as the angle of friction between the separating rollers and the adjacent load carrying rollers, and upon the ratio of the diameter of the load carrying rollers to the diameter of the inner race (or the diameter of the journal as the case may be).

Accordingly, as a further object of my invention, I aim to provide an improved cageless roller bearing having separating rollers disposed between, and of smaller diameter than the load carrying rollers, and wherein the angle of friction between the separating rollers and the load carrying rollers, and the ratio of the diameter of the load carrying rollers to the diameter of the inner race, are such that the separating rollers exert little or no pressure against the bearing races.

Figure 1:
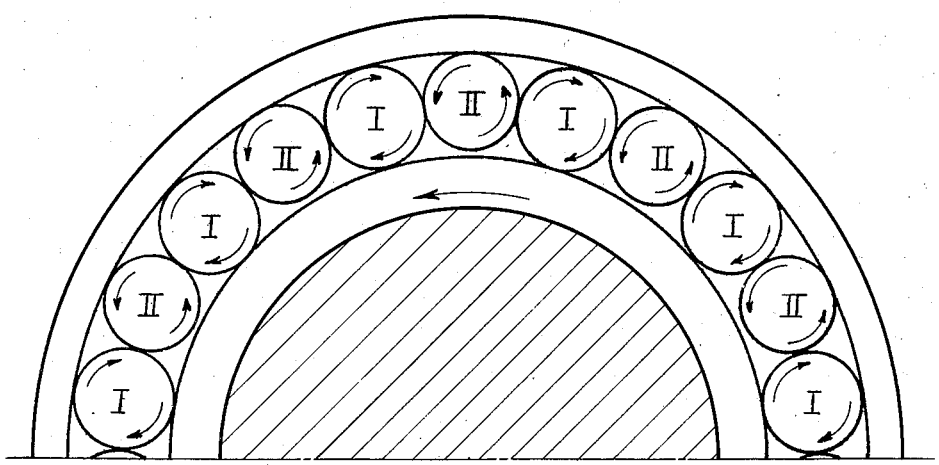
Figure 2:
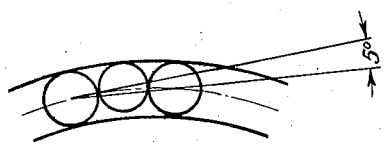

In the accompanying drawing, illustrating one form which the invention may assume, Fig. 1 is an end elevation of the upper half of a cageless roller bearing constructed according to my invention, but wherein the difference in diameter between the spacing rollers and load carrying rollers is exaggerated, and Fig. 2 is a diagrammatic view of a group of the individual rollers of my cageless bearing.

Detailed reference will now be made to the accompanying drawing, wherein the reference character $a$ designates a journal, and $b$ and $c$ designate, respectively, the inner and outer races of my improved cageless bearing. The load carrying rollers, which are shown as arranged in an annularly extending series between the races, are designated I, and the separating rollers, of which one is shown between each pair of load carrying rollers, are designated II. The arrows indicate the direction of running of the rollers in the bearing. From the arrangement of rollers shown in the drawing it will be seen that the load carrying rollers and the separating roller together provide substantially a full complement or full annular series of rollers. From the direction of running of the rollers, as indicated by the arrows, it will also be seen that all of the load carrying rollers rotate in the same direction and that the separating rollers rotate in the opposite direction, in the manner of idlers between the load carrying rollers.

It should be understood that the rollers may be either cylindrical or tapered in form.

According to my invention, and as pointed out above, the separating rollers are of smaller diameter than the load carrying rollers and exert little or no pressure against the bearing races. To overcome the undesirable tendency for the separating rollers to be pressed against the outer race by the wedging action of the load carrying rollers, as pointed out above, I construct the rollers of my cageless bearing such that when the ratio of the diameter of the inner race (or of the journal as the case may be) to the diameter of the load carrying rollers is six to one, or greater, the angle of friction between the separating rollers and the load carrying rollers will be seven degrees or less.

What is meant by the angle of friction between the separating rollers and the load carrying rollers, is illustrated diagrammatically in Fig. 2. As shown in the drawing, the angle of friction is that angle, of which one side is formed by a straight line connecting the centers of two adjacent load carrying rollers and the other side is formed by a straight line connecting the center of one of the two load carrying rollers with the center of the intermediate separating roller when the latter is in contact with the outer race. The angle of friction illustrated in Fig. 2 is shown as being five degrees.

From the arrangement of rollers illustrated and described, it will be seen that with the correct choice of value for the angle of friction and for the ratio between the diameter of the load carrying rollers and the diameter of the inner race, the tendency will be for each pair of load carrying rollers to hold the separating roller, which is therebetween, out of contact with the inner and outer bearing races. This action results in sliding friction, between the separating rollers and the races, being substantially eliminated, and in the wear, consequent to sliding friction, being reduced to a minimum. When the centrifugal force, which acts on the separating rollers, overcomes the forces tending to hold these rollers out of engagement with the bearing races, the separating rollers contact with the outer race, but the pressure thus exerted against the outer race by the separating rollers is very light and does not destroy the film of oil on the outer race.

I claim:

1. In a cageless roller bearing, bearing rollers, an outer race and an inner race for said bearing rollers and separating rollers inserted between said bearing roller, said separating rollers having a smaller diameter than said bearing rollers, the angle of friction between each bearing and separating roller being seven degrees and less and the ratio of diameter between the inner race and the bearing rollers being six to one and more.

2. A roller bearing comprising outer and inner races, a plurality of load-carrying rollers between said races, and separating rollers between the load-carrying rollers, the diameters of said rollers being such that the angle of friction between the separating rollers and the load-carrying rollers does not exceed seven degrees when the ratio of the diameter of the inner race to the diameter of the load-carrying rollers is not less than six to one.

3. As an article of manufacture a precision roller bearing comprising outer and inner cylindrical races, and an annular series of rollers between said races including load-carrying rollers and separating rollers between the adjacent load-carrying rollers, the separating rollers being of smaller diameter than the load-carrying rollers and the diameters of the load-carrying and separating rollers being so proportioned that the angle of friction between the separating and the load-carrying rollers is approximately five degrees and the ratio of the diameter of the inner race to the diameter of the load-carrying rollers is not less than six to one, whereby the forces tending to move the separating rollers toward the outer race are counteracted and substantially balanced by forces tending to move the separating rollers away from the outer race and substantial pressure of the separating rollers against the outer race is prevented.

RICHARD GÖTZ.